(12) United States Patent
Dorenbos et al.

(10) Patent No.: US 7,067,815 B2
(45) Date of Patent: Jun. 27, 2006

(54) SCINTILLATOR CRYSTAL, METHOD FOR MAKING SAME USE THEREOF

(75) Inventors: Pieter Dorenbos, Rijswijk (NL); Carel Wilhelm Eduard Van Eijk, Delft (NL); Hans-Ulrich Gudel, Thorishaus (NL); Karl Wilhelm Kramer, Bern (CH); Edgar Valentijn Dieuwer Van Loef, Rotterdam (NL)

(73) Assignee: Stichting Voor de Technische Wetenschappen, JP Utrecht (NL)

( * ) Notice: Subject to any disclaimer, the term of this patent is extended or adjusted under 35 U.S.C. 154(b) by 179 days.

(21) Appl. No.: 10/204,005

(22) PCT Filed: Feb. 16, 2001

(86) PCT No.: PCT/EP01/01837

§ 371 (c)(1),
(2), (4) Date: Nov. 25, 2002

(87) PCT Pub. No.: WO01/60944

PCT Pub. Date: Aug. 23, 2001

(65) Prior Publication Data

US 2004/0238747 A1    Dec. 2, 2004

(30) Foreign Application Priority Data

Feb. 17, 2000   (NL) .................. 1014401

(51) Int. Cl.
C09K 11/85    (2006.01)
G01T 1/202    (2006.01)

(52) U.S. Cl. .............. 250/370.11; 250/370.01

(58) Field of Classification Search ........... 250/370.11, 250/370.01, 370.12, 370.13, 483.1, 361 R, 250/484.1
See application file for complete search history.

(56) References Cited

U.S. PATENT DOCUMENTS

| | | | |
|---|---|---|---|
| 3,959,442 A | 5/1976 | Pastor et al. | |
| 3,978,337 A | 8/1976 | Nickles et al. | |
| 4,251,315 A | 2/1981 | Pastor et al. | |
| 4,337,397 A | 6/1982 | Vacher | |
| 4,510,394 A | 4/1985 | Allemand et al. | |
| 4,559,597 A | 12/1985 | Mullani | |
| 4,563,582 A | 1/1986 | Mullani | |
| 4,647,779 A | 3/1987 | Wong | |
| 4,761,347 A | 8/1988 | Nakamura | |
| 4,768,156 A | 8/1988 | Whitehouse et al. | |
| 4,833,327 A | 5/1989 | Hart | |
| 4,839,090 A * | 6/1989 | Rosette et al. | ....... 252/301.4 H |
| 4,864,140 A | 9/1989 | Rogers et al. | |
| 4,980,552 A | 12/1990 | Cho et al. | |
| 5,015,860 A | 5/1991 | Moses | |
| 5,015,880 A | 5/1991 | Drake et al. | |
| 5,025,151 A * | 6/1991 | Melcher | ............ 250/269.6 |
| 5,039,858 A | 8/1991 | Anderson et al. | |
| 5,134,293 A | 7/1992 | Anderson et al. | |
| 5,151,599 A | 9/1992 | Monnet et al. | |
| 5,159,195 A | 10/1992 | Van House | |
| 5,168,540 A * | 12/1992 | Winn et al. | ............ 385/128 |
| 5,213,712 A | 5/1993 | Dole | |
| 5,272,343 A | 12/1993 | Stearns | |
| 5,272,344 A | 12/1993 | Williams | |
| 5,319,203 A | 6/1994 | Anderson et al. | |
| 5,326,974 A | 7/1994 | Karras et al. | |
| 5,453,623 A | 9/1995 | Wong et al. | |
| 5,478,498 A | 12/1995 | Kodama et al. | |
| 5,532,489 A | 7/1996 | Yamashita et al. | |
| 5,665,971 A | 9/1997 | Chen et al. | |
| 5,786,600 A | 7/1998 | Lambert et al. | |
| 5,821,541 A | 10/1998 | Turner | |
| 5,841,140 A | 11/1998 | McCroskey et al. | |
| 5,869,836 A | 2/1999 | Linden et al. | |
| 5,882,547 A | 3/1999 | Lynch et al. | |
| 5,892,227 A * | 4/1999 | Schieber et al. | ....... 250/370.12 |
| 5,911,824 A | 6/1999 | Hammond et al. | |
| 6,072,177 A | 6/2000 | McCroskey et al. | |
| 6,093,245 A | 7/2000 | Hammond et al. | |
| 6,236,050 B1 | 5/2001 | Turner | |
| 6,255,655 B1 | 7/2001 | McCroskey et al. | |
| 6,278,832 B1 * | 8/2001 | Zagumennyi et al. | ....... 385/141 |

(Continued)

FOREIGN PATENT DOCUMENTS

DE    44 43 001    6/1995

(Continued)

OTHER PUBLICATIONS

N. Pelletier-Allard et al.: "Multiphoton excitations in neodymium chlorides" Database Chemabs Online!, Chemical Abstracts Service Database accession No. 107:225257 CA.

(Continued)

*Primary Examiner*—Otilia Gabor
(74) *Attorney, Agent, or Firm*—Oblon, Spivak, McClelland, Maier & Neustadt, P.C.

(57) ABSTRACT

An inorganic scintillator material, a method for growing the monocrystalline scintillator material, and the use of the scintillator material as component of a scintillating detector in particular for industrial and medical purposes and in the oil industry. The inorganic scintillator material has the general composition $M_{1-x}Ce_xCl_3$, wherein: M is selected among lanthanides or lanthanide mixtures, preferably among the elements or mixtures of elements of the group consisting of Y, La, Gd, Lu, in particular among the elements or mixtures of elements of the group consisting of La, Gd and Lu; and x is the molar rate of substitution of M with cerium, x being not less than 1 mol % and strictly less than 100 mol %.

107 Claims, No Drawings

U.S. PATENT DOCUMENTS

| | | | |
|---|---|---|---|
| 6,323,489 | B1 * | 11/2001 | McClellan ............... 250/361 R |
| 6,362,479 | B1 | 3/2002 | Andreaco et al. |
| 6,420,711 | B1 | 7/2002 | Turner |
| 6,437,336 | B1 | 8/2002 | Pauwels et al. |
| 6,448,560 | B1 | 9/2002 | Turner |
| 6,451,106 | B1 | 9/2002 | Mayolet et al. |
| 6,585,913 | B1 | 7/2003 | Lyons et al. |
| 6,624,420 | B1 | 9/2003 | Chai et al. |
| 6,624,422 | B1 | 9/2003 | Williams et al. |
| 6,699,406 | B1 | 3/2004 | Riman et al. |
| 2002/0156279 | A1 | 10/2002 | Boussie et al. |
| 2003/0211369 | A1 | 11/2003 | Riman et al. |
| 2005/0082484 | A1 | 4/2005 | Srivastava et al. |
| 2005/0104001 | A1 | 5/2005 | Shah |
| 2005/0104002 | A1 | 5/2005 | Shah |

FOREIGN PATENT DOCUMENTS

| | | |
|---|---|---|
| JP | 03 285898 | 12/1991 |
| JP | 06-135715 | 5/1994 |
| NL | 1014401 | 2/2000 |
| SU | 1 273 779 | 11/1986 |
| WO | 01/60944 | 8/2001 |
| WO | 01/60945 | 8/2001 |

OTHER PUBLICATIONS

J. Skjaeret et al.: "Competing interactions and properties of cerium lanthanum chloride (Ce1-xLaxC13)" Database Chemabs Online!, Chemical Abstracts Service Database accession No. 119:284498 CA.

O. Guillot-Noel et al.: "Optical scintillation properties of cerium-doped CaCl3, LuBr3 and LuCl3" Journal of Luminescence, vol. 85, pp. 21-35 1999.

U.S. Appl. No. 10/204,005, filed Aug. 16, 2002, pending.

U.S. Appl. No. 10/204,006, filed Aug. 16, 2002, pending.

Cwe Van Eijk: "Development of inorganic scintillators" Nuclear Instruments & Methods in Physics Research, Section—A: Accelerators, Spectrometers, Detectors and Associated Equipment, vol. 392, No. 1-3, pp. 285-290, 1997.

Database Inspec Online!, Institute of Electrical Engineers As Voloshinovskii et al.: "Luminescence properties of cerium chloride" Database accession No. 4726740, XP002150542 (abstract only).

J. Skjaeret, et al, Competing interactions and properties of $Ce_{1-x}La_xCl_3$ (Journal of Magnetism and Magnetic Materials 127 (1993) 163-168.

Van Eijk, et al., "Energy resolution of some new inorganic-scintillator gamma-ray detectors," Radiation Measurements, vol. 33, pp. 521-525 (2001).

Korczak, et al. "Crystal Growth and temperature variation of the lattice parameters in LaF3, CeF3, PrF3 and NdF3" Journal of Crystal Growth, vol. 61, No. 3, pp. 601-605, 1983.

Blistanov A.A., et al. "Peculiarities of the growth of disordered Na, R-fluorite (R=Y, Ce-Lu) single crystals" Journal of Crystal Growth, vol. 237-239, pp. 899-903, Apr. 2002.

Duffy, S., et al. "Bridgman growth and laser excitation of LiYF4:Sm3+" Journal of Crystal Growth, vol. 203, No. 3, pp. 405-411, Jun. 1999.

"Scintillation Properties of $LaCl_3:Ce^{3+}$Crystals: Fast, Efficient, and High-Energy Resolution Scintillators," E.V.D. van Loef et al., IEEE Transactions on Nuclear Science, vol. 48, No. 3, Jun. 2001, pp. 341-345.

"High-Energy-Resolution Scintillator: $Ce^{3+}$Activated $LaCl^3$," E.V.D. van Loef et al., Applied Physics Letters, vol. 77, No. 10, Sep. 2000, pp. 1467-1468.

"High-Energy-Resolution Scintillator: $Ce^{3+}$Activated $LaBr_3$," E.V.D. van Loef et al., Applied Physics Letters, vol. 79, No. 10, Sep. 2001, pp. 1573-1575.

Allemand, R. et al., "Potential advantages of a cesium fluoride scintillator for a time-of-flight positron camera," J. Nucl. Med., 21:153:155 (1980).

Bollinger, L. and Thomas, G., "Measurement of the time dependence of scintillation intensity by a delayed-coincidence method," Rev. Sci. Instrum., 32:1044-1050 (Sep. 1961).

Budinger, T., "Time-of-flight positron emission tomography: status relative to conventional PET," J. Nucl. Med., 24:73-78 (Jan. 1983).

Burnham, C. et al., "New instrumentation for positron scanning," International Conference on Radioisotopes in Localization of Tumors, England, Sep. 25-27 (1967).

Detko, J.F., "Operational characteristics of a small ultra-pure germanium gamma camera," Semiconductor Detectors in Medicine, Mar. 8-9 (1973), U.S. Atomic Energy Commission Office of Information Services Technical Information Center.

Dorenbos, P. et al., "Non-proportionality in the scintillation response and the energy resolution obtainable with scintillation crystals," IEEE Trans. Nucl. Sci., 42:2190-2202 (Dec. 1995).

Gariod, R. et al., "'LET1' positron tomography architecture and time of flight improvements," Workshop on Time-of-Flight Positron Tomography, May 17-19 (1982), Washington University, St. Louis, Missouri, IEEE Catalog No. 82CH1719-3.

Guillot-Nöel, O. et al., "Scintillation properties of $RbGd_2Br_7$:Ce advantages and limitations," IEEE Trans. Nucl. Sci., 46:1274-1284 (Oct. 1999).

Kaufman, L. et al., "Delay line readouts for high purity germanium medical imaging cameras," IEEE Trans. Nucl. Sci., NS-21:652-657 (Feb. 1974).

Lewellen, TK, "Time-of-flight PET," Semin. Nucl. Med., 28:268-275 (Jul. 1998).

Lewellen, TK et al., "Performance measurements of the SP3000/UW time-of-flight positron emission tomograph," IEEE Trans. Nucl. Sci., 35:665-669 (Feb. 1988).

Moses, W. and Derenzo, S., "Scintillators for positron emission tomography," Proceedings of SCINT '95, Delft, The Netherlands, pp. 9-16 (1996).

Moses, W. et al., "Gamma ray spectroscopy and timing using LSO and PIN photodiodes," IEEE Trans. Nucl. Sci., NS-42:597-600 (1995).

Moses, W. et al., $LuAlO_3$ :Ce—a high density, high speed scintillator for gamma detection, IEEE Trans. Nucl. Sci., NS-42:275-279 (1995).

Moses, W. et al., "Performance of a PET detector module with LSO scintillator crystals and photodiode readout," J. Nucl. Med., 37:85P (1996).

Moses, W. and Derenzo, S., "Prospects for time-of-flight PET using LSO scintillator," IEEE Trans. Nucl. Sci., NS-46:474-478 (1999).

Mullani, N. et al., "Dynamic imaging with high resolution time-of-flight PET camera—TOFPET I," IEEE Trans. Nucl. Sci., NS-31:609-613 (Feb. 1984).

Phelps, M., "Positron emission tomography provides molecular imaging of biological processes," PNAS, 97:9226-9233 (Aug. 1, 2000).

Shah, K. et al., "$LuI_3$ :Ce—A new scintillator for gamma ray spectroscopy," 4 pages (Oct. 29, 2003).

Dorenbos, "Light output and energy resolution of $Ce^{3+}$-doped scintillators," Nuclear Instruments and Methods in Physics Research A, vol. 486, pp. 208-213 (2002).

Andriessen, J. et al., "Experimental and theoretical study of the spectroscopic properties of Ce3+ doped LaCl3 single crystals," Optics Communications, vol. 178, No. 4-6, pp. 355-363, May 2000, XP004204283.

Meyer, Gerd et al., "The ammonium chloride route to anhydrous rare earth chlorides—the example of YCl3," Inorg. Synth., vol. 25, pp. 146-150, XP008021415.

Meyer, Gerd et al., "The ammonium-bromide route to anhydrous rare earth bromides MBr3," Journal of the Less Common Metals, vol. 127, pp. 155-160, XP 008021446.

Egger, P. et al., "Czochralski growth of Ba2Y1 -xErxCl7 ($0 < x \leq 1$) using growth equipment integrated into a dry-box," Journal of Crystal Growth, vol. 22, No. 3-4, pp. 515-520, Apr. 1999, XP 004168216.

Weber, M. et al., "Dense $Ce^{3+}$activated scintillator materials," Proceedings of SCINT '95, Delft, The Netherlands, pp. 325-328 (1996).

Wong, W. et al., "Characteristics of small barium fluoride (BaF) scintillator for high intrinsic resolution time-of-flight positron emission tomography," IEEE Trans. Nucl. Sci., NS-31:381-386 (Feb. 1984).

Yamamoto, M. et al., "Time-of-flight positron imaging and the resolution improvement by an interactive method," IEEE Trans. Nucl. Sci., 36(1):998-1002 (Feb. 1989).

Shah, K. et al., "$LaBr_3$ : Ce scintillators for gamma ray spectroscopy," IEEE Trans. Nucl. Sci., LBNL-51793, 4 pages (Dec. 2, 2002).

Surti, S. et al., "Image quality assessment of $LaBr_3$-based whole body 3D PET scanners: a Monte Carlo evaluation," Phys. Med. Biol., 49:4593-4610 (2004).

Van Loef, E. et al., "Scintillation properties of $LaBr_3:Ce^{3+}$ crystals: fast, efficient and high-energy-resolution scintillators," Nucl. Instr. Meth. Physics Res. A, 486:254-258 (2002).

* cited by examiner

SCINTILLATOR CRYSTAL, METHOD FOR MAKING SAME USE THEREOF

The present invention relates to scintillator crystals, to a manufacturing method allowing them to be obtained and to the use of said crystals, especially in gamma-ray and/or X-ray detectors.

Scintillator crystals are widely used in detectors for gamma-rays, X-rays, cosmic rays and particles whose energy is of the order of 1 keV and also greater than this value.

A scintillator crystal is a crystal which is transparent in the scintillation wavelength range, which responds to incident radiation by emitting a light pulse.

From such crystals, generally single crystals, it is possible to manufacture detectors in which the light emitted by the crystal that the detector comprises is coupled to a light-detection means and produces an electrical signal proportional to the number of light pulses received and to their intensity. Such detectors are used especially in industry for thickness or weight measurements and in the fields of nuclear medicine, physics, chemistry and oil exploration.

A family of known scintillator crystals widely used is of the thallium-doped sodium iodide Tl:NaI type. This scintillating material, discovered in 1948 by Robert Hofstadter and which forms the basis of modern scintillators, still remains the predominant material in this field in spite of almost 50 years of research on other materials. However, these crystals have a scintillation decay which is not very fast.

A material which is also used is CsI which, depending on the applications, may be used pure, or doped either with thallium (Tl) or with sodium (Na).

One family of scintillator crystals which has undergone considerable development is of the bismuth germanate (BGO) type. The crystals of the BGO family have high decay time constants, which limit the use of these crystals to low count rates.

A more recent family of scintillator crystals was developed in the 1990s and is of the cerium-activated lutetium oxyorthosilicate Ce:LSO type. However these crystals are very heterogeneous and have very high melting points (about 2200° C.).

The development of new scintillating materials for improved performance is the subject of many studies.

One of the parameters that it is desired to improve is the energy resolution.

This is because in the majority of nuclear detector applications, good energy resolution is desired. The energy resolution of a nuclear radiation detector actually determines its ability to separate radiation energies which are very close. It is usually determined for a given detector at a given energy, such as the width at mid-height of the peak in question on an energy spectrum obtained from this detector, in relation to the energy at the centroid of the peak (see in particular: G. F. Knoll, "Radiation Detection and Measurement", John Wiley and Sons, Inc., 2nd edition, p. 114). In the rest of the text, and for all measurements carried out, the resolution is determined at 662 keV, the energy of the main gamma emission of $^{137}$Cs.

The smaller the value of the energy resolution, the better the quality of the detector. It is considered that energy resolutions of about 7% enable good results to be obtained. Nevertheless, lower values of resolution are of great benefit.

For example, in the case of a detector used to analyze various radioactive isotopes, improved energy resolution enables improved discrimination of these isotopes.

An increase in the energy resolution is particularly advantageous for a medical imaging device, for example of the Anger gamma-camera or positron emission tomography (PET) type, since it enables the contrast and the quality of the images to be considerably improved, thus allowing more accurate and earlier detection of tumors.

Another very important parameter is the scintillation decay time constant; this parameter is usually measured by the "Start Stop" or "Multi-hit" method, (described by W. W. Moses (Nucl. Instr and Meth. A336 (1993)253).

The smallest possible decay time constant is desired, so as to be able to increase the operating frequency of the detectors. In the field of nuclear medical imaging, this makes it possible, for example, to considerably reduce the length of examinations. A decay time constant which is not very high also enables the temporal resolution of devices detecting events with temporal coincidence to be improved. This is the case for positron emission tomographs (PET), where the reduction in the scintillator decay time constant enables the images to be significantly improved by rejecting noncoincident events with more accuracy.

In general, the spectrum of scintillation decay as a function of time may be broken down into a sum of exponentials, each characterized by a decay time constant.

The quality of a scintillator is essentially determined by the properties of the contribution from the fastest emission component.

The standard scintillating materials do not allow both good energy resolutions and fast decay time constants to be obtained.

This is because materials such as Tl:NaI have good energy resolution under gamma excitation, of about 7%, but a high decay time constant of about 230 ns. Similarly, Tl:CsI and Na:CsI have high decay time constants, especially greater than 500 ns.

Decay time constants which are not very high can be obtained with Ce:LSO, especially of about 40 ns, but the energy resolution under gamma excitation at 662 keV of this material is generally greater than 10%.

Recently, scintillating materials have been disclosed by O. Guillot-Noël et al. ("Optical and scintillation properties of cerium doped $LaCl_3$, $LuBr_3$ and $LuCl_3$," in Journal of Luminescence 85 (1999) 21–35). This article describes the scintillation properties of cerium-doped compounds such as $LaCl_3$ doped with 0.57 mol % Ce; $LuBr_3$ doped with 0.021 mol %, 0.46 mol % and 0.76 mol % Ce; $LuCl_3$ doped with 0.45 mol % Ce. These scintillating materials have quite useful energy resolutions, of the order of 7%, and decay time constants of the fast scintillation component which are fairly low, especially between 25 and 50 ns. However, the intensity of the fast component of these materials is low, especially of the order of 1000 to 2000 photons per MeV, which means that they cannot be used as a component of a high-performance detector.

This object of the present application relates to a material capable of having simultaneously a good energy resolution, especially at least as good as that of Tl:NaI, a low decay time constant, especially at least equivalent to that of Ce:LSO, and where the intensity of the fast scintillation component is suitable for producing high-performance detectors, in particular is greater than 4000 ph/MeV (photons per MeV), or even greater than 8000 ph/MeV (photons per MeV).

According to the invention, this aim is achieved by an inorganic scintillating material of general composition $M_{1-x}Ce_xCl_3$, where M is chosen from the lanthanides or mixtures of lanthanides, preferably from the elements or the mixtures of elements of the group: Y, La, Gd, Lu, especially from the elements or the mixtures of elements of the group: La, Gd, Lu, and where x is the molar level of substitution of M by cerium, subsequently called "cerium content", where x is greater than or equal to 1 mol % and strictly less than 100 mol %.

The term "lanthanide" refers to the transition elements of atomic numbers 57 to 71, and to yttrium (Y), as is standard in the technical field of the invention.

An inorganic scintillating material according to the invention substantially consists of $M_{1-x}Ce_xCl_3$ and may also comprise impurities usual in the technical field of the invention. In general, the usual impurities are impurities coming from the raw materials whose content is in particular less than 0.1%, or even less than 0.01%, and/or the unwanted phases whose volume percentage is especially less than 1%.

In fact, the inventors have known how to show that the $M_{1-x}Ce_xCl_3$ compounds defined above, where the cerium content is greater than or equal to 1 mol %, have remarkable properties. The scintillation emission of the materials according to the invention has an intense fast component (of at least 4000 ph/MeV) and a low decay time constant, of the order of 25 ns. At the same time, these materials have excellent energy resolution at 662 keV, in particular less than 5%, and even than 4%.

These properties are even more remarkable since they are unexpected and highlight a considerable discontinuity of properties starting from 1 mol % of cerium. This choice of composition is even more surprising since the cerium-doped scintillators having good performance, such as LSO, contain less than 1% cerium, and preferably about 0.2% (see for example M. Kapusta et al., "Comparison of the scintillation properties of LSO:Ce manufactured by different laboratories and of LGSO:Ce", IEEE transaction on nuclear science, Vol. 47, No. 4, August 2000).

A preferred material according to the invention has the formula $La_{1-x}Ce_xCl_3$.

According to one embodiment, the scintillating material according to the invention has an energy resolution of less than 5%.

According to another embodiment, the scintillating material according to the invention has a fast decay time constant of less than 40 ns, or even of less than 30 ns.

According to a preferred embodiment, the scintillating material according to the invention has both an energy resolution less than 5% and a fast decay time constant of less than 40 ns, or even less than 30 ns.

In a preferred manner, the cerium content x is between 1 mol % and 90 mol %, and even in particular greater than or equal to 2 mol %, or even greater than or equal to 4 mol % and/or preferably less than or equal to 50 mol %, or even less than or equal to 30 mol %.

According to one embodiment, the scintillating material according to the invention is a single crystal making it possible to obtain components of high transparency, the dimensions of which are enough to efficiently stop and detect the radiation to be detected, including at high energy. The volume of these single crystals is in particular of the order of 10 mm$^3$, or even greater than 1 cm$^3$ and even greater than 10 cm$^3$.

According to another embodiment, the scintillating material according to the invention is a powder or polycrystal, for example in the form of powders mixed with a binder or else in the form of a sol-gel.

The invention also relates to a method for obtaining the scintillating material $M_{1-x}Ce_xCl_3$, defined above, in the form of a single crystal by the Bridgman growth method, for example in evacuated sealed quartz ampoules, in particular from a mixture of commercial $MCl_3$ and $CeCl_3$ powders.

The invention also relates to the use of the scintillating material above as a component of a detector for detecting radiation in particular by gamma rays and/or X-rays.

Such a detector especially comprises a photodetector optically coupled to the scintillator in order to produce an electrical signal in response to the emission of a light pulse produced by the scintillator.

The photodetector of the detector may in particular be a photomultiplier, or else a photodiode, or else a CCD sensor.

The preferred use of this type of detector relates to the measurement of gamma or X-ray radiation; such a system is also capable of detecting alpha and beta radiation and electrons. The invention also relates to the use of the above detector in nuclear medicine apparatuses, especially gamma cameras of the Anger type and positron emission tomography scanners (see for example C. W. E. Van Eijk, "Inorganic Scintillator for Medical Imaging", International Seminar New types of Detectors, 15–19 May 1995—Archamp, France. Published in "Physica Medica", Vol. XII, supplement 1, June 96).

According to another variant, the invention relates to the use of the above detector in detection apparatuses for oil drilling, (see for example "Applications of scintillation counting and analysis", in "Photomultiplier tube, principle and application", chapter 7, Philips).

Other details and characteristics will emerge from the description below of preferred nonlimiting embodiments and of data obtained on samples constituting single crystals according to the invention.

Table 1 shows the characteristic scintillation results for examples according to the invention (examples 1 to 5) and for comparative examples (examples A to D).

x is the cerium content, expressed in mol %, substituted into the atom M.

The measurements are carried out under γ-ray excitation at 662 keV. The measurement conditions are specified in the publication by O. Guillot-Noël, cited above.

The emission intensity is expressed in photons per MeV.

The emission intensity is recorded as a function of the integration time up to 0.5; 3 and 10 microseconds.

The fast scintillation component is characterized by its decay time constant, τ, in nanoseconds, and by its scintillation intensity (in photons/MeV), which represents the contribution of this component to the total number of photons emitted by the scintillator.

The samples used in the measurements of examples A to D and 1 to 3 and 5 are small single crystals of about 10 mm$^3$, and the sample of example 4 is a relatively large single crystal with a diameter of 8 mm and a height of 5 mm. Good reproducibility of the results obtained was noticed between the small (ex3) and large (ex4) samples.

From table 1, it is noticed that the compounds of the $M_{1-x}Ce_xCl_3$ type comprising less than 1 mol % cerium (examples A, D) have an energy resolution greater than 7% and low intensities of the fast scintillation component (of the order of 1500 ph/MeV). The undoped $LaCl_3$ has a decay time constant of the first component of about 3500 ns (exC), and is therefore extremely slow.

In the case of a fluorinated compound doped at more than 1 mol % cerium (example B), the scintillation decay is very fast but the overall scintillation efficiency is very low.

The examples according to the invention, ex1 to ex5, all have very advantageous decay time constants of the fast fluorescence component, between 20 and 30 ns, and the scintillation intensity of this fast component is remarkable and is greater that 4000 ph/MeV. It reaches about 20000 ph/MeV for a material comprising 10 mol % cerium.

In addition, the resolution, R, of these examples according to the invention is excellent and has an unexpected nature.

This is because, from the statistical point of view, it is accepted that the energy resolution varies in proportion to the inverse of the square root of the total number of photons emitted (see in particular: G. F. Knoll, "Radiation detection and measurement", John Wiley and Sons, Inc, $2^{nd}$ edition, p 116). This total number of photons corresponds to the emission intensity at saturation, which is measured by the emission intensity value at 10 µs.

By considering the total number of photons emitted by $LaCl_3$ comprising more than 1 mol % cerium compared with $LaCl_3$ doped at 0.57 mol %, a small improvement of the resolution of at best 5% is expected, the latter therefore going from 7.3% to about 6.9%.

In a particularly surprising manner, the inventors noticed a considerable improvement in the energy resolution for a cerium content greater than 1 mol % in the $M_{1-x}Ce_xCl_3$ materials. This improvement is by a factor of about 2 for $LaCl_3$ comprising 2 mol %, 4 mol %, 10 mol %, 30 mol % cerium (examples 1 to 5).

Scintillating materials having such a performance are particularly suitable for increasing the performance of detectors, both in terms of energy resolution, temporal resolution and count rate.

TABLE 1

| Example | Matrix | x: mol % $Ce^{3+}$ | Emission Intensity (photons/MeV) | | | Resolution: (R %) | Fast Component | |
|---|---|---|---|---|---|---|---|---|
| | | | 0.5 µs | 3 µs | 10 µs | | τ (ns) | Intensity (ph/MeV) |
| A | $LuCl_3$ | 0.45 | 1300 | 3500 | 5700 | 18 | 50 | 1425 |
| B | $LaF_3$ | 10 | 2200 | 2200 | 2200 | >20 | 3 | 220 |
| C | $LaCl_3$ | 0 | | | 34000 | 4.9 | 3480 | 34000 |
| D | $LaCl_3$ | 0.57 | 19000 | 37000 | 44000 | 7.3 | 24 | 1300 |
| ex1 | $LaCl_3$ | 2 | | 44000 | 49000 | 3.7 | 27 | 4900 |
| ex2 | $LaCl_3$ | 4 | 36000 | 47000 | 49000 | 3.4 | 25 | 8800 |
| ex3 | $LaCl_3$ | 10 | 45000 | 49000 | 49000 | 3.7 | 26 | 20100 |
| ex4 | $LaCl_3$ | 10 | 45000 | 49000 | 49000 | 3.3 | 26 | 18500 |
| ex5 | $LaCl_3$ | 30 | 42000 | 43000 | 43000 | 3.3 | 24 | 29700 |

The invention claimed is:

1. An inorganic scintillating material of general composition $M_{1-x}Ce_xCl_3$, where M is chosen from the elements or the mixtures of elements of the group of the lanthanides and Y and where x is the molar level of substitution of M by cerium, where x is greater than or equal to 1 mol % and less than 50 mol %.

2. The inorganic scintillating material as claimed in claim 1, wherein M is chosen from the elements or the mixtures of elements of the group: Y, La, Gd, and Lu.

3. The inorganic scintillating material as claimed in claim 2, wherein the material is a single crystal.

4. The inorganic scintillating material as claimed in claim 3, wherein the single crystal has a volume greater than 10 $mm^3$.

5. The inorganic scintillating material as claimed in claim 3, wherein the single crystal has a volume greater than 1 $cm^3$.

6. The inorganic scintillating material as claimed in claim 3, wherein the single crystal has a volume greater than 10 $cm^3$.

7. The inorganic scintillating material as claimed in claim 3, wherein x is less than or equal to 30 mol % and is greater than or equal to 2 mol % and wherein M is lanthanum (La).

8. A method of growing the single crystal scintillating material as claimed in claim 3, wherein the single crystal is obtained by the Bridgman growth method.

9. A method of growing as claimed in claim 8, wherein growth takes place in an evacuated sealed quartz ampoule.

10. A method of growing as claimed in claim 8, wherein growth takes place from a mixture of $MCl_3$ and $CeCl_3$ powders.

11. The inorganic scintillating material as claimed in claim 2, wherein x is less than or equal to 30 mol %.

12. The inorganic scintillating material as claimed in claim 2, wherein x is greater than or equal to 2 mol %.

13. The organic scintillating material as claimed in claim 2, wherein x is greater than or equal to 4 mol %.

14. The inorganic scintillating material as claimed in claim 2, wherein the scintillating material is a powder or a polycrystal.

15. The inorganic scintillating material as claimed in claim 1, wherein M is chosen from the elements or the mixtures of elements of the group: Gd, Lu.

16. The inorganic scintillating material of claim 1, wherein M is lanthanum (La).

17. The inorganic scintillating material as claimed in claim 1, wherein the inorganic scintillating material consists of $M_{1-x}Ce_xCl_3$.

18. The inorganic scintillating material of claim 1, wherein a scintillation emission of said inorganic scintillating material has a fast scintillation component having an emission intensity of at least 4000 photons per MeV.

19. The inorganic scintillating material of claim 18, wherein said fast scintillation component has a decay time constant of at most 30 ns.

20. The inorganic scintillating material of claim 19, wherein the inorganic scintillating material has an energy resolution of at most 4% at 662 keV.

21. The inorganic scintillating material of claim 18, wherein the inorganic scintillating material has an energy resolution of at most 4% at 662 keV.

22. The inorganic scintillating material of claim 1, wherein a scintillation emission of said inorganic scintillating material has a fast scintillation component having an emission intensity of at least 8000 photons per MeV.

23. The inorganic scintillating material of claim 22, wherein said fast scintillation component has a decay time constant of at most 30 ns.

24. The inorganic scintillating material of claim 23, wherein the inorganic scintillating material has an energy resolution of at most 4% at 662 keV.

25. The inorganic scintillating material of claim 22, wherein the inorganic scintillating material has an energy resolution of at most 4% at 662 keV.

26. The inorganic scintillating material of claim 1, wherein a scintillation emission of said inorganic scintillating material has a fast scintillation component having a decay time constant of at most 30 ns.

27. The inorganic scintillating material of claim 26, wherein the inorganic scintillating material has an energy resolution of at most 4% at 662 keV.

28. The inorganic scintillating material of claim 1, wherein the inorganic scintillating material has an energy resolution of at most 4% at 662 keV.

29. A method of detecting radiation, comprising the steps of:
receiving said radiation with an inorganic scintillating material of general composition $M_{1-x}Ce_xCl_3$ where M is chosen from the elements or the mixtures of elements of the group of the lanthanides and Y and where x is the molar level of substitution of M by cerium, where x is greater than or equal to 1 mol % and less than 50 mol %;
emitting light with said inorganic scintillating material in response to said step of receiving said radiation; and
detecting said light with a photodetector.

30. The method as claimed in claim 29, wherein M is chosen from the elements or the mixtures of elements of the group: Y, La, Gd, Lu.

31. The method as claimed in claim 29, wherein M is lanthanum (La).

32. The method as claimed in claim 29, wherein the inorganic scintillating material is in the form of a single crystal.

33. The method as claimed in claim 32, wherein the single crystal has a volume greater than 10 $mm^3$.

34. The method as claimed in claim 33, wherein x is less than or equal to 30 mol % and is greater than or equal to 2 mol % and wherein M is lanthanum (La).

35. The method as claimed in claim 32, wherein the single crystal has a volume greater than 1 $cm^3$.

36. The method as claimed in claim 32, wherein the single crystal has a volume greater than 10 $cm^3$.

37. The method as claimed in claim 29, wherein x is greater than or equal to 2 mol %.

38. The method as claimed in claim 29, wherein x is greater than or equal to 4 mol %.

39. The method as claimed in claim 29, wherein the energy resolution of the inorganic scintillating material is less than 5% for a measurement with gamma photons at 662 keV.

40. The method as claimed in claim 29, wherein the scintillating material is a powder or a polycrystal.

41. The method as claimed in claim 29 for applications in the medical field, detection for oil drilling, or as the element of a positron emission tomography scanner or of a gamma camera of the Anger type.

42. The method as claimed in claim 29, wherein said inorganic scintillating material consists of $M_{1-x}Ce_xCl_3$.

43. The method of claim 29, wherein a scintillation emission of said inorganic scintillating material has a fast scintillation component having an emission intensity of at least 4000 photons per MeV.

44. The method of claim 43, wherein said fast scintillation component has a decay time constant of at most 30 ns.

45. The method of claim 44, wherein the inorganic scintillating material has an energy resolution of at most 4% at 662 keV.

46. The method of claim 43, wherein the inorganic scintillating material has an energy resolution of at most 4% at 662 keV.

47. The method of claim 29, wherein a scintillation emission of said inorganic scintillating material has a fast scintillation component having an emission intensity of at least 8000 photons per MeV.

48. The method of claim 47, wherein said fast scintillation component has a decay time constant of at most 30 ns.

49. The method of claim 48, wherein the inorganic scintillating material has an energy resolution of at most 4% at 662 keV.

50. The method of claim 47, wherein the inorganic scintillating material has an energy resolution of at most 4% at 662 keV.

51. The method of claim 29, wherein a scintillation emission of said inorganic scintillating material has a fast scintillation component having a decay time constant of at most 30 ns.

52. The method of claim 51, wherein the inorganic scintillating material has an energy resolution of at most 4% at 662 keV.

53. The method of claim 29, wherein the inorganic scintillating material has an energy resolution of at most 4% at 662 keV.

54. A scintillation detector comprising:
an inorganic scintillating material of general composition $M_{1-x}Ce_xCl_3$ where M is chosen from the elements or the mixtures of elements of the group of the lanthanides and Y and where x is the molar level of substitution of M by cerium, where x is greater than or equal to 1 mol % and less than 50 mol %, a photodetector being coupled to said inorganic scintillating material.

55. The scintillation detector as claimed in claim 54, where M is chosen from the elements or the mixtures of elements of the group: Y, La, Gd, Lu.

56. The scintillation detector as claimed in claim 54, wherein M is lanthanum (La).

57. The scintillation detector as claimed in claim 54, wherein the inorganic scintillating material is in the form of a single crystal.

58. The scintillation detector as claimed in claim 57, wherein the single crystal has a volume greater than 10 $mm^3$.

59. The scintillation detector as claimed in claim 57, wherein the single crystal has a volume greater than 1 $cm^3$.

60. The scintillation detector as claimed in claim 57, wherein the single crystal has a volume greater than 10 $cm^3$.

61. The scintillation detector as claimed in claim 54, wherein x is greater than or equal to 2 mol %.

62. The scintillation detector as claimed in claim 54, wherein x is greater than or equal to 4 mol %.

63. The scintillation detector as claimed in claim 54, wherein the energy resolution of the inorganic scintillating material is less than 5% for a measurement with gamma photons at 662 keV.

64. The scintillation detector as claimed in claim 54, wherein the scintillating material is a powder or a polycrystal.

65. The scintillation detector as claimed in claim 54, wherein x is less than or equal to 30 mol % and is greater than or equal to 2 mol % and wherein M is lanthanum (La).

66. A positron emission tomography scanner comprising a scintillation detector as claimed in claim 54.

67. A gamma camera of the Anger type comprising a scintillation detector as claimed in claim 54.

68. The scintillation detector as claimed in claim 54, wherein said inorganic scintillating material consists of $M_{1-x}Ce_xCl_3$.

69. The scintillation detector of claim 54, wherein a scintillation emission of said inorganic scintillating material has a fast scintillation component having an emission intensity of at least 4000 photons per MeV.

70. The scintillation detector of claim 69, wherein said fast scintillation component has a decay time constant of at most 30 ns.

71. The scintillation detector of claim 70, wherein the inorganic scintillating material has an energy resolution of at most 4% at 662 keV.

72. The scintillation detector of claim 69, wherein the inorganic scintillating material has an energy resolution of at most 4% at 662 keV.

73. The scintillation detector of claim 54, wherein a scintillation emission of said inorganic scintillating material has a fast scintillation component having an emission intensity of at least 8000 photons per MeV.

74. The scintillation detector of claim 73, wherein said fast scintillation component has a decay time constant of at most 30 ns.

75. The scintillation detector of claim 74, wherein the inorganic scintillating material has an energy resolution of at most 4% at 662 keV.

76. The scintillation detector of claim 73, wherein the inorganic scintillating material has an energy resolution of at most 4% at 662 keV.

77. The scintillation detector of claim 54, wherein a scintillation emission of said inorganic scintillating material has a fast scintillation component having a decay time constant of at most 30 ns.

78. The scintillation detector of claim 77, wherein the inorganic scintillating material has an energy resolution of at most 4% at 662 keV.

79. The scintillation detector of claim 54, wherein the inorganic scintillating material has an energy resolution of at most 4% at 662 keV.

80. An inorganic scintillating material, comprising
an $MCl_3$ matrix and a Ce dopant, wherein:
M is any element or mixture of elements of the lanthanides and Y; and
a level of the Ce dopant in the matrix, expressed as a molar level of substitution of M by Ce, is at least 1 mol % and less than 50 mol %.

81. The inorganic scintillating material of claim 80, further comprising at most 0.1% impurities.

82. The inorganic scintillating material of claim 81, wherein a total volume of unwanted phases corresponding to the impurities does not exceed 1% of a volume of the inorganic scintillating material.

83. The inorganic scintillating material of claim 82, wherein a scintillation emission of said inorganic scintillating material has a fast scintillation component having an emission intensity of at least 8000 photons per MeV and a decay time constant of at most 30 ns.

84. The inorganic scintillating material of claim 82, wherein the inorganic scintillating material is a single crystal obtained using the Bridgman growth method.

85. The inorganic scintillating material of claim 80, wherein M is any element or mixture of elements of Y, La, Gd, and Lu.

86. The inorganic scintillating material of claim 80, wherein M is La.

87. The inorganic scintillating material of claim 86, wherein the level of Ce dopant in the matrix, expressed as a molar level of substitution of La by Ce, is at least 2 mol % and less than 50 mol %.

88. The inorganic scintillating material of claim 86, wherein the level of Ce dopant in the matrix, expressed as a molar level of substitution of La by Ce, is at least 2 mol % and at most 30 mol %.

89. The inorganic scintillating material of claim 86, wherein the inorganic scintillating material is a single crystal obtained using the Bridgman growth method.

90. The inorganic scintillating material of claim 80, wherein a scintillation emission of said inorganic scintillating material has a fast scintillation component having an emission intensity of at least 8000 photons per MeV.

91. The inorganic scintillating material of claim 90, wherein said fast scintillation component has a decay time constant of at most 30 ns.

92. The inorganic scintillating material of claim 90, wherein the inorganic scintillating material has an energy resolution of at most 4% at 662 keV.

93. The inorganic scintillating material of claim 80, wherein a scintillation emission of said inorganic scintillating material has a fast scintillation component having a decay time constant of at most 30 ns.

94. The inorganic scintillating material of claim 80, wherein the inorganic scintillating material has an energy resolution of at most 4% at 662 keV.

95. The inorganic scintillating material of claim 80, wherein the inorganic scintillating material is a single crystal obtained using the Bridgman growth method.

96. The inorganic scintillating material of claim 80, wherein a scintillation emission of said inorganic scintillating material has a fast scintillation component having an emission intensity of at least 4000 photons per MeV.

97. A radiation detector, comprising:
an inorganic scintillating material comprising an $MCl_3$ matrix and a Ce dopant; and
a photodetector coupled to the inorganic scintillating material and configured to produce an electrical signal in response to an emission of a light pulse produced by the inorganic scintillating material in response to radiation, wherein:
M is any element or mixture of elements of the lanthanides and Y, and
a level of the Ce dopant in the matrix, expressed as a molar level of substitution of M by Ce, is at least 1 mol % and less than 50 mol %.

98. The radiation detector of claim 97, wherein the photodetector comprises a photomultiplier.

99. The radiation detector of claim 97, wherein the photodetector comprises a photodiode.

100. The radiation detector of claim 97, wherein the photodetector comprises a CCD sensor.

101. The radiation detector of claim 97, wherein the radiation comprises gamma-rays.

102. The radiation detector of claim 97, wherein the radiation comprises X-rays.

103. The radiation detector of claim 97, wherein the radiation comprises alpha particles.

104. The radiation detector of claim 97, wherein the radiation comprises beta particles.

105. The radiation detector of claim 97, wherein the inorganic scintillating material and the photodetector are installed in an Anger camera.

106. The radiation detector of claim 97, wherein the inorganic scintillating material and the photodetector are installed in a positron emission tomography scanner.

107. The radiation detector of claim 97, wherein the inorganic scintillating material and the photodetector are installed in an oil drilling detection apparatus.

* * * * *